United States Patent
Lowe et al.

[11] 3,731,113
[45] May 1, 1973

[54] BELT DAMAGE DETECTOR

[75] Inventors: Richard B. Lowe, Glendale Heights, Ill.

[73] Assignee: The Goodyear Tire & Rubber Company, Akron, Ohio

[22] Filed: Sept. 9, 1971

[21] Appl. No.: 178,977

[52] U.S. Cl. .................. 307/119, 198/40, 198/232, 340/259
[51] Int. Cl. ............................................. H01h 35/00
[58] Field of Search .......................... 307/92, 94, 119, 307/125, 131; 340/253, 256, 258, 259; 198/40, 232

[56] References Cited

UNITED STATES PATENTS

| 3,651,506 | 3/1972 | Olaf et al. | 198/232 |
| 3,602,360 | 8/1971 | Halbach et al. | 198/40 UX |

*Primary Examiner*—Herman J. Hohauser
*Attorney*—F. W. Brunner et al.

[57] ABSTRACT

A detector for indicating when a tear or other damage occurs in a conveyor belt and automatically turning off the belt drive motor before further damage can occur. The detector utilizes one or more electrical conductors such as wire loops extending transversely across the belt which are either embedded within the belt or positioned on one surface of the belt. A stationary electrical contact is positioned adjacent each edge of the belt to contact an exposed contact portion of the loop. The stationary contacts are connected to a circuit which controls the power to the belt drive motor and when the stationary contacts touch the contact portions of one of the conductor loops, current will flow through the loop and so long as the current flow is not stopped by a break in the conductor loop, the circuit will maintain a closed power line to the motor driving the belt. If a rip occurs in the belt, the conductor loop is broken at that point, thereby stopping the flow of current in the loop. When this occurs, the circuit shuts off the drive motor, thereby stopping the belt before further damage can occur.

5 Claims, 5 Drawing Figures

Patented May 1, 1973
3,731,113
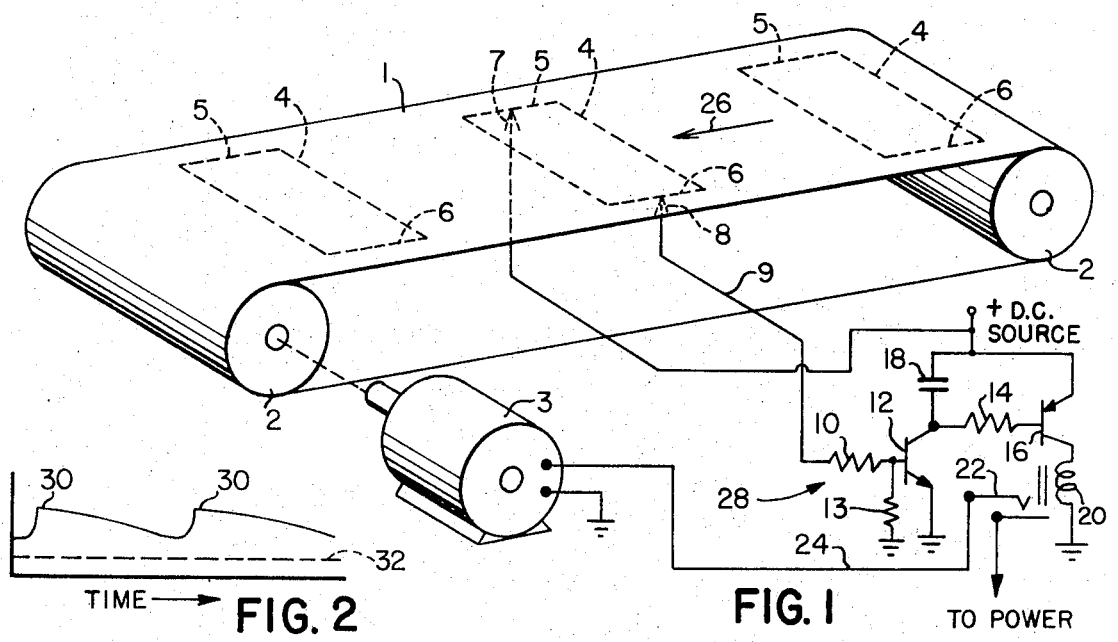
FIG. 2
FIG. 1  TO POWER
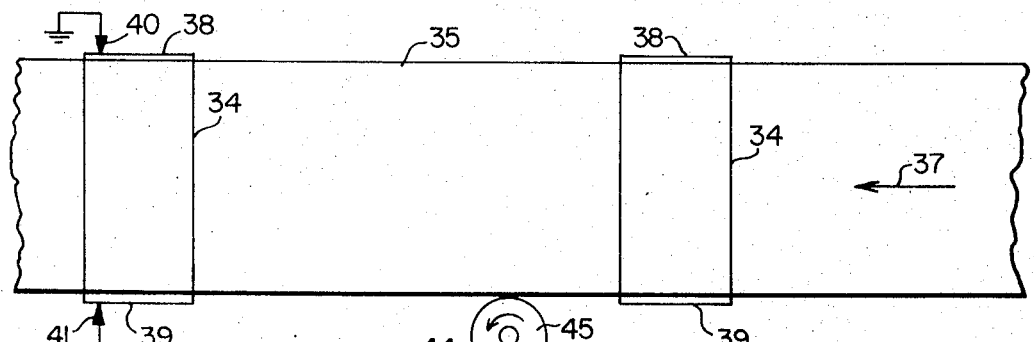
FIG. 3
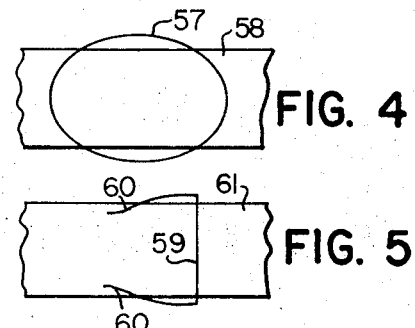
FIG. 4
FIG. 5
INVENTORS.
RICHARD B. LOWE
ROBERT S. ENABNIT
BY
*Milliken*
ATTORNEY

BELT DAMAGE DETECTOR

This invention relates to a detector for indicating when a tear or other damage occurs in a conveyor belt and includes a means to turn off the drive motor of the belt to prevent further damage.

BACKGROUND OF THE INVENTION

In the past, it has been a common problem, particularly with heavy-duty conveyor belts which transport bulk materials such as metallic ore and the like, that sharp edges of the material may tend to become lodged in such a position that they will cause longitudinal slitting or tearing of the belt. When such a tear occurs, if the belt is not stopped within a short time, the tear can continue along the length of the belt and thereby damage extremely long lengths of the belt which could otherwise be saved if the belt could be stopped as soon as the tear first starts.

OBJECTS OF THE INVENTION

It is a primary object of this invention to provide a belt damage detector which will rapidly determine when a tear has occurred in a moving belt and quickly and automatically stop the belt before the tear extends along a greater length of the belt.

This and other objects of the invention will become more fully apparent as the description proceeds in the following specification and the accompanying drawings.

BRIEF DESCRIPTION OF THE DRAWINGS

FIG. 1 is a simplified perspective view of a belt illustrating one embodiment of the invention;

FIG. 2 is a graph showing a typical pulse of current through the relay emitted by the circuit in FIG. 1;

FIG. 3 is a schematic view showing a second embodiment of the invention; and

FIGS. 4 and 5 show additional modifications of the conductor loop positioned on the belt.

DESCRIPTION OF THE PREFERRED EMBODIMENTS

Referring to FIG. 1 of the drawings, an endless belt 1 is supported on a plurality of rollers 2, at least one of which is driven by a motor 3. The belt 1 has a plurality of electrically conductive sensor loops 4 extending transversely across the belt and spaced apart an equal distance from each other along the length of the belt. Each loop 4 is preferably encapsulated beneath the surface of the belt but has exposed edge contact portions 5 and 6 respectively adjacent each lateral edge of the belt and preferably exposed on the lower side of the belt to be contacted respectively by stationary contacts 7 and 8 which may be sliding contacts or roller contacts which are electrically connected to a circuit which will be hereafter described in greater detail.

The stationary contact 7 is connected to a positive voltage supply and the stationary contact 8 is connected to the detecting circuit through a line 9 and through resistor 10 which is connected to the base of transistor 12 which is normally held at ground potential by resistor 13. Transistor 12 also has its collector connected through resistor 14 to the base of transistor 16. A capacitor 18 is connected between the collector of transistor 12 and the DC source voltage, as is the emitter of transistor 16. The collector of transistor 16 is connected to a relay 20 which operates a normally closed switch 22 which controls the flow of power through a line 24 to the motor 3.

In operation, as the belt 1 moves in the direction of the arrow 26 driven by the motor 3, the contacts 5 and 6 of loops 4 respectively pass across stationary contacts 7 and 8, thereby completing the circuit and permitting current to flow through the circuit and operate the relay 20 and maintain the switch 22 in the closed position, thereby providing power through line 24 to the motor 3. During the time the loop 4 is in contact with the circuit 28, the transistor 12 permits current to flow and charge up the capacitor 18 as indicated on the peaks 30 in FIG. 1. This charge on the capacitor 18 serves as a time delay mechanism to provide sufficient power to the relay 20 during the interval when the loops 4 are out of contact with circuit 28 so that the relay will still hold the switch 22 in the closed position. During this interval the charge on the capacitor 18 slowly decays as shown in FIG. 2. The transistor 16 serves as a driver for the relay 20. So long as there is no break in any of the loops 4, the capacitor 18 will receive charges frequently enough to operate the relay 20 and keep the power flowing to the belt drive motor. If one of the loops 4 is broken by a tear in the belt, the current will not flow through the circuit 28 and the capacitor 18 will not be sufficiently charged to permit the belt 1 to continue to operate until the next unbroken loop 4 touches the contacts 7 and 8. If the voltage in the capacitor 18 drops below a certain threshold shown by the line 32 in FIG. 2, the relay will drop out and cause the switch 22 to open and stop the motor 3.

FIG. 3 shows another embodiment of the invention in which a different timer circuit is used to provide continued operation of the belt drive motor during the time interval which the conductor loops 34 in the belt 35 are out of contact with a timer and control circuit 36. The belt 35 moves in the direction shown by arrow 37 and each of the loops 34 has exposed contact portions 38 and 39 on each lateral edge thereof which respectively contact stationary contacts 40 and 41 mounted adjacent each edge of the belt 35. Contact 40 is connected to ground and contact 41 is connected to a power line 42 connected to the circuit 36. The circuit 36 is a bistable flip-flop circuit which is triggered by a microswitch 43 activated by a pin 44 on a timer wheel 45 which rotates in time with the speed of the belt 35. Each time the wheel 45 rotates one complete revolution the pin 44 activates the switch 43 and the next loop is in position.

The flip-flop circuit 36 is normally set in state with transistor 52 conducting, with a relay 48 closed, with microswitch 43 open and contacts 40 and 41 not in contact with contacts 38 and 39 of loop 34. The voltage at point 50 thus maintains transistor 46 below its conduction threshold. As the belt 35 moves, contacts 38 and 39 touch the stationary contacts 40 and 41 prior to activation of the microswitch 45 which grounds point 50 during the period of loop passage across contacts 40 and 41. At some point within this period, the microswitch 43 is momentarily closed, but with point 50 grounded, this cannot affect the state of transistor 52 and the flip-flop, therefore the belt continues to run.

If the cross-belt circuit of one of the loops 34 is destroyed, however, by a tear or cut in the belt, point 50 is not held at ground potential during the period the microswitch 43 is closed, and, as a result, an additional positive potential is applied across resistors 53 and 54. The resulting current increase in resistor 54 elevates the voltage to point 50 to a value above the conduction threshold of transistor 52 and the flip-flop is triggered to its alternate stable state with transistor 46 cut-off. With transistor 46 no longer conducting, the relay 48 opens breaking the belt "run" circuit and stopping the belt.

FIG. 4 shows an alternate loop 57 in a belt 58 and FIG. 5 shows a conductor wire 59 with turned end contacts 50 on a belt 61.

Various configurations of conductors can be used in the belt and the exposed contact portions of the conductor can be at the bottom of the belt or along the edges depending upon the particular type of belt on which the detector is used. While a flat belt was shown merely to illustrate the invention, it can be used with other types of belts such as those with tapered sides used to retain bulk material on the belt. Various other modifications can be made in the positioning of the conductor in the belt and in the specific circuitry used to pass a current through the conductor without departing from the scope of the invention.

We claim:

1. A belt damage detector in combination with an endless belt supported by a plurality of rollers and having a driving means effecting longitudinal movement of the belt, the detector comprising:

A. at least one electrical conductor mounted to move with the belt and extending transversely across the width thereof with exposed contact portions provided along the lateral edges of the belt, said conductor adapted to be broken upon the occurrence of damage to the belt;

B. circuit means in relative stationary position to the belt comprising (a) a pair of electrical contacts positioned to contact respective exposed portions of the conductor as it moves proximate to the contacts to provide a close-circuited condition when in contact with the conductor and an open-circuited condition when in contact with a broken conductor or in the absence of a conductor, and (b) means connected to the pair of contacts to operatively maintain the circuit means for a period when no conductor is in relative position to the contacts; and C. switching means operatively connected to the circuit means and driving means and responsive to the current flowing in the circuit means to provide power to the driving means in response to the open or closed circuit condition of the circuit means.

2. A detector as claimed in claim 1 (3) including a plurality of electrical conductors spaced equidistant from each other along the length of the belt.

3. A detector as claimed in claim 1 wherein the (time delay) means to operatively maintain the circuit means is a capacitor charged during the period when a conductor provides closed-circuited contact with the circuit means and discharged when an open circuit exists between the circuit means contacts to provide current to maintain the switching means during the period of the open circuit.

4. A detector as claimed in claim 3 wherein the capacitor has a time constant such that maintenance of an open circuit between the circuit means contacts for a period longer than the period between two successive conductors cuts off the current through the switching means and inactivates the driving means.

5. A detector as claimed in claim 2 wherein the (time delay) means to operatively maintain the circuit means is a bi-stable, flip-flop circuit maintained in a first stable state in the presence of successive close-circuited belt conductors and switched to a second stable state when any one of the plurality of conductors is open circuited to cut off the current through the switching means and inactivate the driving means.

* * * * *

PO-1050
(5/69)

UNITED STATES PATENT OFFICE
CERTIFICATE OF CORRECTION

Patent No. 3,731,113        Dated May 1, 1973

Inventor(s) Richard B. Lowe and Robert S. Enabnit

It is certified that error appears in the above-identified patent and that said Letters Patent are hereby corrected as shown below:

Co-inventor Robert S. Enabnit, Akron, Ohio, should be included.

Column 2, line 16, "Figure 1" should be -- Figure 2 --.

Signed and sealed this 25th day of December 1973.

(SEAL)
Attest:

EDWARD M. FLETCHER, JR.        RENE D. TEGTMEYER
Attesting Officer                Acting Commissioner of Patents